United States Patent
Liu et al.

(10) Patent No.: US 6,850,022 B2
(45) Date of Patent: Feb. 1, 2005

(54) METHOD AND SYSTEM FOR DETERMINING ELECTRONIC COMMUTATION IN BRUSHLESS DC MACHINES IRRESPECTIVE OF THE PLACEMENT OF ROTOR POSITION SENSORS

(75) Inventors: Ke Liu, Ontario (CA); Scott Kirkpatrick, Ontario (CA); John Makaran, Ontario (CA)

(73) Assignee: Siemens VDO Automotive Inc., Chatham (CA)

( * ) Notice: Subject to any disclaimer, the term of this patent is extended or adjusted under 35 U.S.C. 154(b) by 106 days.

(21) Appl. No.: 10/342,925

(22) Filed: Jan. 15, 2003

(65) Prior Publication Data

US 2004/0135530 A1 Jul. 15, 2004

(51) Int. Cl.$^7$ .......................... H02P 7/50; H01R 39/46; H02K 13/00
(52) U.S. Cl. ...................... 318/439; 318/254; 318/459; 318/445; 388/928.1
(58) Field of Search ................................ 318/445, 459, 318/500, 138, 254, 439, 720–724, 727; 388/928, 928.1

(56) References Cited

U.S. PATENT DOCUMENTS

| | | |
|---|---|---|
| 4,403,179 A | 9/1983 | Kohzai et al. |
| 4,405,885 A | 9/1983 | Okamoto |
| 4,449,079 A | 5/1984 | Erdman |
| 4,743,815 A | 5/1988 | Gee et al. |
| 5,099,182 A | 3/1992 | Isaacson et al. |
| 5,384,527 A * | 1/1995 | Rozman et al. ............... 322/10 |
| 5,448,141 A | 9/1995 | Kelley et al. |
| 5,481,510 A | 1/1996 | Masaki et al. |
| 5,534,763 A | 7/1996 | Williams et al. |
| 5,552,682 A * | 9/1996 | Ushikoshi .................. 318/254 |
| 5,616,996 A | 4/1997 | Tang et al. ................. 318/439 |
| 5,729,102 A | 3/1998 | Gotou et al. |
| 5,761,375 A * | 6/1998 | Naito ......................... 388/806 |
| 5,780,983 A * | 7/1998 | Shinkawa et al. .......... 318/254 |
| 5,850,130 A | 12/1998 | Fujisaki et al. |
| 5,859,519 A | 1/1999 | Archer |
| 5,920,162 A | 7/1999 | Hanson et al. |
| 5,929,577 A * | 7/1999 | Neidorff et al. ............ 318/254 |

(List continued on next page.)

FOREIGN PATENT DOCUMENTS

| | | |
|---|---|---|
| DE | 101 17 252 A1 | 10/2002 |
| WO | WO 98/52275 | 11/1998 |

OTHER PUBLICATIONS

PCT International Search Report—EP 03 02 2731 Date of Completion—Feb. 18, 2004.
Netzer's Electric Position Sensing Technology. Oct. 2000. Netzer Precision Motion Sensors Ltd.

*Primary Examiner*—David Martin
*Assistant Examiner*—Renata McCloud

(57) ABSTRACT

A method and system for determining the commutation position in a DC machine using a single-bit rotor sensor and the back EMF signal from a stator winding by calculating a delay value, which is equal to the time elapsed between detection of the position signal and the back EMF signal, and establishing commutation after a period of time equal to the delay value has elapsed from when the position signal is detected.

7 Claims, 3 Drawing Sheets

U.S. PATENT DOCUMENTS

| | | |
|---|---|---|
| 5,970,032 A | 10/1999 | Ikeda et al. |
| 5,990,651 A | 11/1999 | Iwazawa et al. |
| 6,034,493 A | 3/2000 | Boyd et al. |
| 6,081,087 A | 6/2000 | Iijima et al. |
| 6,104,113 A | 8/2000 | Beifus |
| 6,181,093 B1 * | 1/2001 | Park et al. .................. 318/254 |
| 6,211,588 B1 | 4/2001 | Balsiger ................... 310/68 B |
| 6,218,795 B1 * | 4/2001 | Syukuri ...................... 318/254 |
| 6,239,564 B1 | 5/2001 | Boe et al. |
| 6,420,847 B1 * | 7/2002 | Galbiati et al. ............. 318/727 |
| 6,433,503 B1 | 8/2002 | Uematsu et al. ............ 318/700 |
| 6,479,956 B1 * | 11/2002 | Kawabata et al. .......... 318/254 |
| 6,534,938 B1 * | 3/2003 | Wu et al. ................... 318/254 |
| 6,555,977 B1 * | 4/2003 | Du et al. .................... 318/254 |
| 6,600,287 B2 * | 7/2003 | Gotou ........................ 318/599 |
| 2001/0043806 A1 | 11/2001 | Gorti et al. |
| 2001/0048278 A1 | 12/2001 | Young et al. |
| 2002/0053890 A1 | 5/2002 | Gotou et al. |

* cited by examiner

METHOD AND SYSTEM FOR DETERMINING ELECTRONIC COMMUTATION IN BRUSHLESS DC MACHINES IRRESPECTIVE OF THE PLACEMENT OF ROTOR POSITION SENSORS

This Application is based on U.S. Provisional Application No. 60/442,564 filed Oct. 31, 2002, entitled "Method And System For Determining Electronic Commutation In DC Machines Irrespective Of The Placement Of Rotor Position Sensor", and claims the benefit thereof for priority purposes.

FIELD OF THE INVENTION

The invention relates to brushless DC (Direct Current) machines, such as motors and generators and, more particularly, to a method and system for determining commutation positions in brushless DC machines irrespective of the placement of a rotor position sensor.

BACKGROUND OF THE INVENTION

DC machines, including DC generators and DC motors, are known. One type of DC machine is a brushless DC motor. Brushless DC motors are sometimes referred to as brushless permanent magnet motors, synchronous permanent magnet motors, or electronically commutated DC motors. Brushless DC motors are used for many applications, including applications in the automotive field.

A brushless DC motor has a rotor with permanent magnets and a stator with windings. In brushless DC motors the commutation of the stator windings is performed electronically based on the rotor position. Thus, there are no brushes or mechanical commutator, and instead control electronics are used to energize the stator windings synchronously. The stator windings are switched on and off in sequence to create a rotating magnetic field around the stator, which creates torque to pull and rotate the rotor.

There are several advantages in brushless machines over brushed machines—there are no sparks from a brush, and brush-life, brush residue and noise issues are either nonexistent or mitigated. Brushless DC machines can be faster, more efficient, reliable and quiet than DC machines with brushes. However, brushless DC machines require electronic commutation control to energize each stator winding at the right time.

To properly control the energization of the stator windings, sensors associated with the rotor are used to signal electronics to control switching elements. The sensors sense the rotor position relative to each stator winding. The current in the stator windings is controlled in frequency and phase angle to maintain a constant angular displacement between the poles of the rotating stator field and the rotor field poles. Such a constant angular displacement also exists in many other DC machines, such as DC generators.

The stator current may be either bipolar or unipolar. Bipolar may be reversible rectangular waves or sinusoidal; unipolar is usually a rectangular wave, with no current reversal.

The control electronics that energizes the stator windings must know the instantaneous rotor position relative to each stator winding. As stated above, this is done with sensors. However, determining the relative position between a rotor pole and a stator pole cannot be done unless the initial mounted position of the rotor sensors relative to each stator winding is known. Thus, the accuracy of the positioning of the sensors is a critical aspect of a brushless DC motor. This positioning affects the current flowing through the stator windings, the torque produced in the motor, the losses, the efficiency, and the stress on power electronic components.

Several types of sensors have been used to determine rotor position, such as absolute position sensors, single-bit position sensors, or sensors that measure the stator winding's back EMF (electromotive force) zero crossing points, or a combination thereof. To sense a stator winding's back EMF, the winding that is being measured cannot be energized. This means that, in a three-phase motor that uses back EMF for this purpose, only two phases will have current flowing through them at any given time.

Absolute position sensors are more expensive than, and relatively undesirable compared to, single-bit position sensors. Single-bit position sensors can be magnetic (such as Hall sensors) or optical (such as an optical shaft encoder), are often less expensive than absolute position sensors, and are more reliable than back EMF sensors since back EMF sensors do not work at speeds close to zero.

However, a single-bit position sensor must be mounted in precise alignment with the stator windings. Accurate alignment of a single-bit position sensor requires specialized production equipment and labor, which increase production costs. The alignment can be affected by factors such as mechanical wear of production equipment, deviation of settings, etc.

To improve the drawbacks of a single-bit position sensor, a novel process is presented, which can automatically correct for mounting position error of single-bit position sensor.

Accordingly, there is a need to provide a method and system for correcting rotor sensor mounting error in brushless DC machines.

SUMMARY OF THE INVENTION

In the subject invention, rotor position sensors and back EMF sensing circuitry are used to determine commutation. In particular, the time difference between the signal from the position sensor and the back EMF sensor is detected and used to determine the commutation position by adding this difference as a delay to the position sensor signal. Therefore, the mounting error of the position sensor is corrected and, with respect to mounting the position sensor, alignment is not critical in production.

The invention provides a method and system for determining the commutation position in a brushless DC machine using a single-bit rotor sensor and the back EMF signal from a stator winding. A delay value equal to the time elapsed between detection of the position signal and the back EMF signal is measured, and commutation is established after a period of time equal to the delay value has elapsed from when each position signal is detected.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
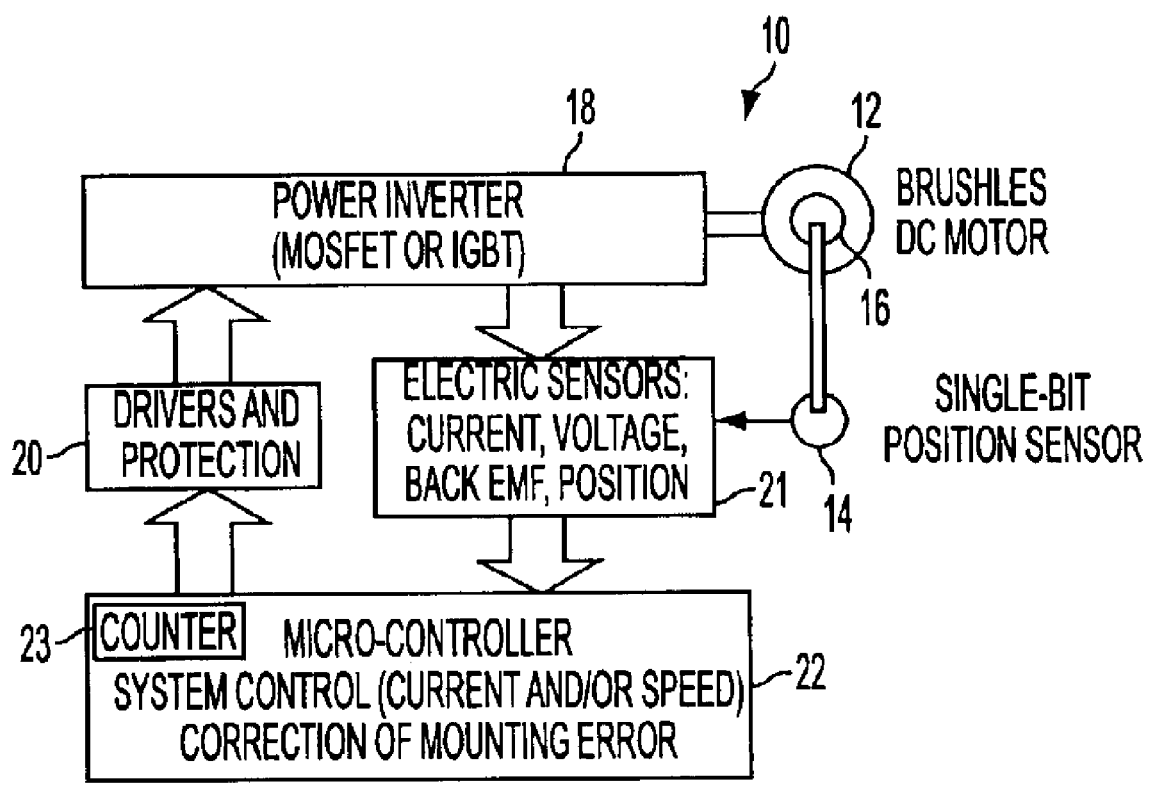
FIG. 1 is a block diagram of a brushless DC motor control system provided in accordance with the principles of the present invention.

With reference to FIG. 1, a brushless DC motor control system, provided in accordance with the invention, is shown generally indicated at 10. The system 10 includes a brushless DC machine (in this case motor 12), which can be 3-phase, 5-phase, etc.

As shown in FIG. 1, a power inverter 18 is associated with the motor 12. The inverter takes DC power, e.g., from an automobile's battery, and energizes the stator windings in a certain sequence. The electrical variables, such as current, voltage, back EMF, etc, are measured by electronics sensors 21, the function of which will be explained below. The measurement results from the sensors 21 are supplied to a micro-controller 22, which executes system control (current, speed or both). The micro-controller corrects for the mounting position "error" of the rotor position sensor and controls commutation to energize the stator windings. The control signals are sent to a drivers and protection device 20, which includes driver and protection circuitry for the power inverter 18. The power inverter 18, the micro-controller 22, and the electronics sensors 21 are described in more detail below.

The inverter 18 can be built using power electronics switching components, such as IGBTs (insulated gate bipolar transistors), MOSFETs (metal oxide field effect transistors) or other suitable switching components. Micro-controller 22 can execute software to control the operation of the motor 12

Electronic sensors 21 include a current sensor, a motor voltage sensor and back EMF detection circuitry. A single-bit position sensor 14 is operatively associated with a rotor 16 of the motor 12 and in communication with the sensors 21 to determine the instantaneous position of rotor 16 with respect to the stator windings. The sensor 14 can be optical (such as an optical shaft encoder), magnetic (such as a Hall sensor) or any type of sensor used to sense rotor position. The rotor position sensor produces a signal (in the form of a square wave), which is supplied to the micro-controller 22 to activate the transistor switch at the appropriate time.

Rotation of rotor produces a back EMF in the stator windings of motor 12. The zero crossing points of the back EMF in one of the phase windings is detected via the detection circuitry of sensors 21. The time difference between the signal from the position sensor 14 and the detected back EMF is determined and is used to determine the commutation position by adding this difference as a delay to the position sensor signal. Therefore, the mounting error of the position sensor is corrected and alignment of the position sensor is not critical in production.

Figure 2:
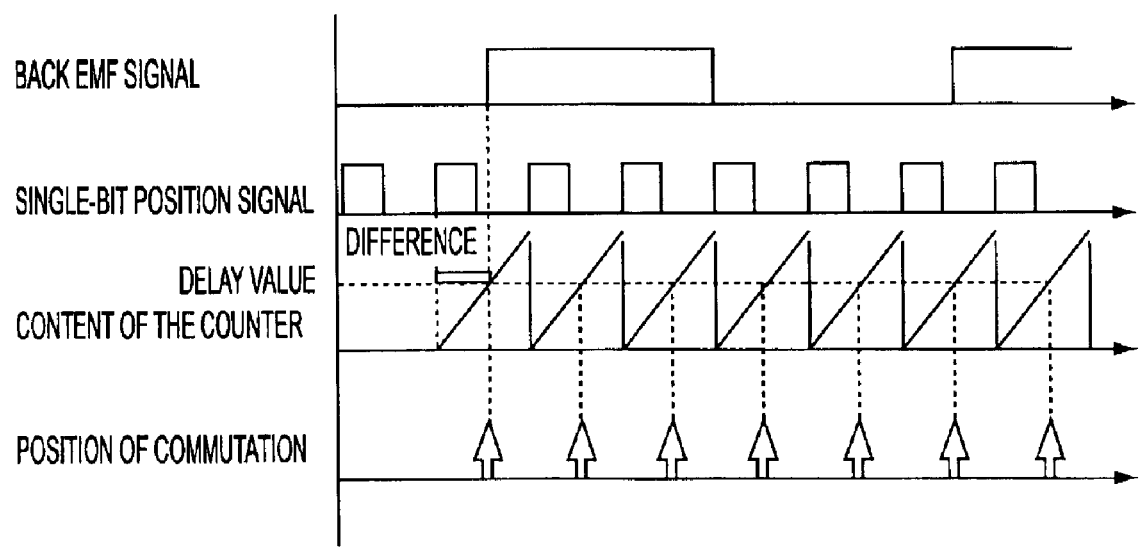
FIG. 2 shows the various waveforms (Back EMF, position signal, counter, position of commutation) used to correct the mounting error of a position sensor, in accordance with the invention.

FIG. 2 shows the various waveforms (back EMF, position signal, counter, position of commutation) used to correct the mounting error of a position sensor, in accordance with the invention. The purpose of the process is to determine the commutation positions based on the signal from the non-aligned single-bit position sensor 14 with the help of the sensed back EMF. Thus, the input signals are the signals from the position sensor and back EMF sensing. To simplify the analysis, the position sensor waveform and the back EMF signal were assumed to be square waves. This assumption is reasonable while discussing the operation principle of brushless DC motors. Of course, the position waveform and back EMF signal need not be square waves in operation, according to the principles of the invention.

Figure 3:
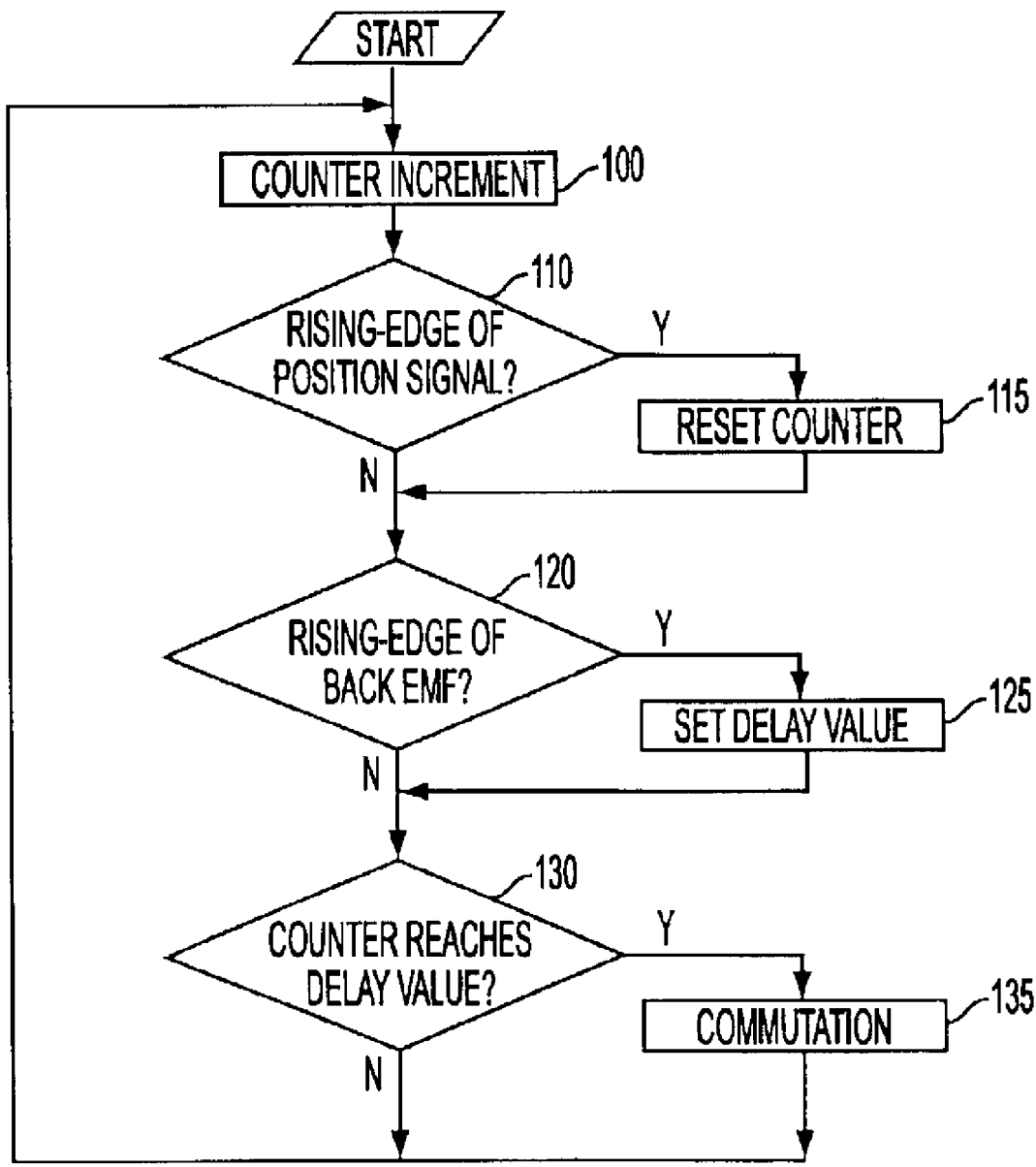
FIG. 3 is a flowchart indicating the correction process shown in FIG. 2, in accordance with the invention.

FIG. 3 is a flowchart indicating the correction process shown in FIG. 2. As shown in FIG. 2 and FIG. 3, the back EMF signal becomes high when the back EMF of the winding is positive, and becomes low when negative.

A counter 23 is included in microcontroller 22. Counter 23 is used to measure the time difference between the back EMF signal and the position signal. In FIG. 3, step 100 is to activate the counter 23. Each time a rising edge of the position signal is detected (as determined in step 110), the counter 23 is reset to zero (as shown in step 120). Until another rising position signal edge is detected, the counter value ramps up linearly as shown in FIG. 2. When a rising edge of the back EMF signal is detected in step 120, the instantaneous value of the counter value is saved as the delay value in step 125. Thus, the delay value is the time elapsed between the start of the position and back EMF signals. If desired, the delay value can be measured each time a back EMF signal rising edge is detected, according to the process above.

The delay value is used to determine the commutation position, which dictates when each stator winding is to be energized. To determine the commutation position, step 130 determines when the counter value reaches the delay value. When the counter value equals the delay value, commutation 135 occurs. Thereafter, the counter value will be reset once a rising edge of a rotor position signal is detected in step 110 as described above, and the other subsequent steps described above and shown in FIG. 3 will repeat for determining the next commutation position.

This invention is directed towards determining commutation position of a brushless DC machine that has already been started. There are several known ways to start a brushless DC machine. For example, two conventional start-up schemes that are used without absolute position sensors are: (1) braking the rotor to a known position and then start running the motor from that position, (2) or energizing the motor windings in a open-loop sequence to bring the motor up to a certain speed and then switch to closed-loop commutation. Of course there are other ways for starting a brushless DC machine, which can be used with the invention.

The foregoing preferred embodiments have been shown and described for the purposes of illustrating the structural and functional principles of the present invention, as well as for illustrating the methods of employing the preferred embodiments and are subject to change without departing from such principles. Therefore, this invention includes all modifications encompassed within the spirit of the following claims.

What is claimed is:

1. A method of determining commutation in a brushless DC machine irrespective of the placement of a rotor position sensor, the method comprising the steps of:

(A) detecting a rotor position signal via the rotor position sensor;

(B) detecting a back EMF (electromotive force) signal of a stator winding;

(C) calculating a delay value equal to the time elapsed between detection of the position signal and the back EMF signal; and (D) establishing commutation after a period of time equal to the delay value has elapsed from when the position signal is detected.

2. The method of claim 1, wherein the rotor position sensor is a single bit sensor.

3. The method of claim 1, wherein the step of detecting the back EMF signal includes detecting a rising edge of the back EMF signal.

4. The method of claim 1, wherein the step of detecting the rotor position signal includes detecting a rising edge of the position signal.

5. A system for determining commutation in a brushless DC machine comprising:

(A) means for detecting a rotor's position relative to stator windings;

(B) means for detecting a stator winding's back EMF (electromotive force);

(C) means for determining the time elapsed between a detection of the position signal and the back EMF, wherein the time elapsed is called a delay value; and (D) means for establishing commutation after a period of time equal to the delay value has elapsed from when the position signal is detected.

6. A method of establishing commutation in a brushless DC machine irrespective of the placement of a rotor position sensor, the method comprising the steps of:

(A) detecting a rotor position signal via the rotor position sensor;

(B) detecting a back EMF (electromotive force) signal of a stator winding;

(C) setting a counter value to zero when a rising edge of the position signal is detected;

(D) setting a delay value when a rising edge of the back EMF signal is detected, the delay value being a time difference between detection of the rising edge of the position signal and the rising edge of the back EMF signal; and (E) establishing commutation when the counter value is equal to the delay value.

7. The method of claim 6, wherein commutation is established by adding the delay value to the detected position signal.

* * * * *